Oct. 13, 1959
L. A. RICE
2,908,854
BATTERY CHARGING CIRCUIT
Filed March 12, 1956
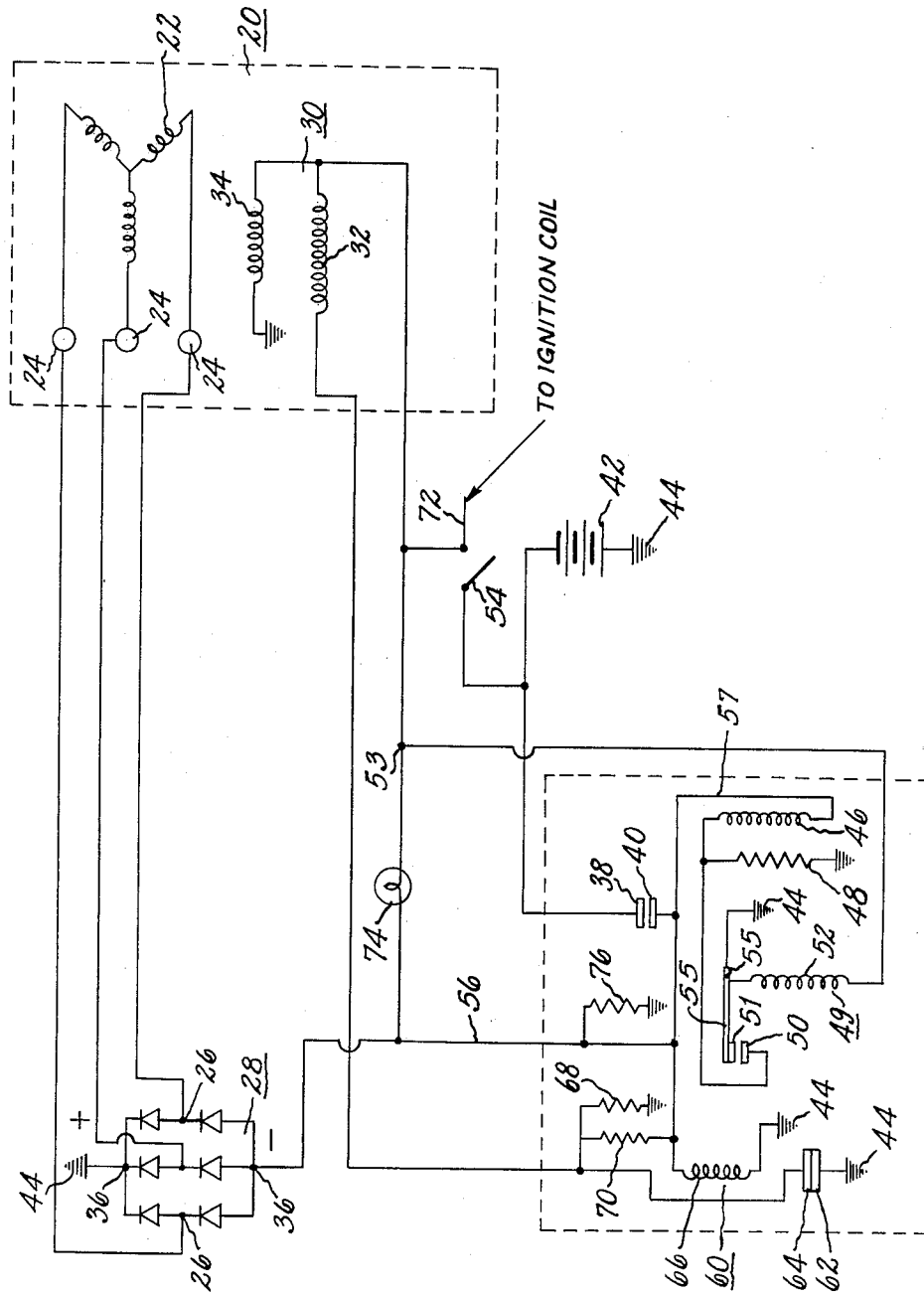
INVENTOR.
LYMAN A. RICE
BY
ATTORNEY United States Patent Office 2,908,854
Patented Oct. 13, 1959

2,908,854

BATTERY CHARGING CIRCUIT

Lyman A. Rice, Anderson, Ind., assignor to General Motors Corporation, Detroit, Mich., a corporation of Delaware Application March 12, 1956, Serial No. 570,898

4 Claims. (Cl. 320—40)

This invention relates to storage battery charging circuits and more particularly to systems wherein a storage battery is charged by an A.C. generator which is driven by a variable speed prime mover such as an engine of a motor vehicle.

The vehicles of the present day are frequently provided with alternators which are driven by the vehicle prime mover to supply alternating current to various pieces of electrical equipment and direct current for battery charging and other purposes. Further, it has been found desirable to include an indicator lamp in the present day vehicles, to indicate to the vehicle operator that the electrical system is in working order and that the battery is being properly charged. In the systems, as heretofore known, the alternator output is usually changed by a rectifier to direct current which is impressed across the terminals of the battery through a circuit which is controlled by a suitable relay called a cutout relay. This relay is generally responsive to the opening and closing of the ignition switch to prevent discharge of the battery through the rectifier when the vehicle is idle for appreciable periods. It has been found in systems wherein the cutout relay is controlled directly by the ignition switch, the rectifier frequently is damaged when the alternator output is high and the ignition switch is opened.

In the battery charging system according to the present invention, the above objectionable feature is substantially eliminated and an indicating lamp is provided in the circuit without resorting to such devices as auxiliary rectifiers as heretofore have been used to make the indicator lamp operate.

In the battery charging circuit according to the present invention, the indicator lamp is connected in a circuit between the output terminals of the rectifier and the battery. This circuit is controlled by the ignition switch of the prime mover so the indicator lamp will burn whenever the ignition switch is closed and the alternator output is insufficient to charge the battery. When this condition is present, the battery potential is impressed across the indicator lamp which is grounded through the regulator coils and resistors which are present in the system. When, however, the alternator voltage output builds up so both terminals of the lamp are at substantially the same potential, then the lamp will be extinguished. The above, according to the present invention, is made possible by the use of a cutout relay which is controlled by an auxiliary relay which is energized through the ignition switch from the battery.

The use of an auxiliary relay as indicated in a battery charging system of the type contemplated is also advantageous in that it will prevent damage of the rectifier under certain operating conditions. That is, it will permit the cutout or line relay to remain closed when the ignition switch is opened and the alternator output is high. This is accomplished by the fact that the relays operate in series and both must operate in sequence before the rectifier can be disconnected from the battery. Further, if desired, the auxiliary relay can incorporate a time delay feature when necessary to permit the generator speed and output to reduce sufficiently before the line relay is opened.

It is an object of the present invention to control the operation of the cutout relay in a battery charging system that includes an alternator and rectifier with an auxiliary relay whose operation is controlled by an ignition switch.

Another object of the present invention is to include an indicator lamp and an auxiliary relay in a battery charging system wherein the output of an alternator is changed to direct current by a rectifier and the circuits to both the indicator lamp and auxiliary relay are connected with the battery through the ignition switch of the vehicle.

In carrying out the above objects, it is another object of the present invention to provide a means for indicating the condition of an alternator in a battery charging system and to prevent damage of a rectifier in the system when the ignition switch to the prime mover is opened. This is accomplished by circuiting both an indicator lamp and an actuating coil of an auxiliary relay through the ignition switch so that both will be energized when the alternator output is insufficient to charge the battery and the ignition switch is closed, and both will be deenergized without breaking the circuit between the rectifier and battery when the alternator output is high and the ignition switch is opened.

A further object of the present invention is to delay the opening of the cutout relay in a battery charging system that includes an alternator and rectifier when the alternator output is high and an ignition switch to the prime mover of the alternator is opened. This is accomplished by controlling the actuation of the cutout relay by an auxiliary relay whose actuation is controlled by the ignition or run switch of the prime mover.

Further objects and advantages of the present invention will be apparent from the following description, reference being had to the accompanying drawings wherein a preferred embodiment of the present invention is clearly shown.

In the drawings:

The single figure diagrammatically shows a battery charging system for a motor vehicle according to the present invention.

In the drawing, an alternator 20 is shown. This alternator may be either of the Y or delta connected type and is here shown as having a Y-connected stator winding 22 which, through load terminals 24, supplies alternating current to the input terminals 26 of the power rectifier 28. The alternator 20 is provided with a conventional type exciting field winding 30 which may have a main coil 32 and a reverse coil 34 to provide the alternator 20 with the proper current and voltage output characteristics when the alternator 20 is driven at variable speeds by the vehicle prime mover, not shown.

One of the output terminals 36 of the rectifier 28 is grounded at 44 and the other output terminal 36 is connected through a suitable direct current circuit which includes a pair of normally open contacts 38 and 40 with a storage battery 42. The storage battery 42 has one of its terminals grounded at 44. The contacts 38 and 40 are part of a cutout relay that has its actuating coil winding 46 connected to a parallel circuit which includes a resistance 48 and an auxiliary relay means 49.

The auxiliary relay means 49 has a pair of normally open contacts 50 and 51 and an actuating coil winding 52. One end of the coil winding 52 is grounded at 44 and the other end is connected in a circuit through a junction 53 and the ignition switch 54 with the battery 42. Thus, whenever the ignition switch is closed, the coil winding 52 will be energized and move the armature 55 of the relay 49 so that contacts 50 and 51 close. The closure of contacts 50 and 51 will cause a circuit from the ungrounded terminal 36 to be completed through lead 56, lead 57, coil winding 46, closed contacts 50 and 51 and armature 55 to ground 44. When this circuit is completed, coil winding 46 will be energized and cause the contacts 38 and 40 to close and thus complete the circuit from the rectifier 28 through lead 56 to the battery 42. After the above circuit to winding 46 is completed, the winding 46 will continue to be energized by either the output of the battery 42 or the rectifier 28 so the contacts 38 and 40 will remain closed even if the alternator 20 ceases to produce an output so long as switch 54 is closed.

The circuits shown in the drawing also include the resistance 48. The inclusion of this resistance 48 is desirable in the system as it will permit the contacts 38 and 40 to remain closed under certain conditons when switch 54 is opened to cause contacts 50 and 51 to open. This arrangement will prevent damage to the rectifier when the prime mover is operating at a high r.p.m. and the alternator output is high. Under this condition, when the ignition or run switch 54 is opened, the circuit to coil winding 52 will be immediately broken and contacts 50 and 51 will open to break the circuit between coil winding 46 and armature 55. When this circuit is broken, the coil winding 46 will be grounded through resistance 48 and will remain at least momentarily energized by the high output of the alternator 20 and rectifier 28 so that the contacts 38 and 40 remain closed so the rectifier circuit to the battery 42 remains unbroken for a time sufficient to prevent damage to the electrical units of the system.

The generator field 32 is connected to the battery 42 through the ignition switch 54 of the prime mover. This switch, when closed, will complete a circuit through the field winding 32 and the voltage regulator 60. The regulator 60 has a pair of normally closed contacts 62 and 64, which are adapted to be open when the energization of the coil winding 66 of the regulator 60 exceeds a predetermined value in response to the voltage potential which is present between the direct current circuit, i.e., the output terminal 36, and the ground 44. The voltage regulator 60 may be of any suitable type of the vibratory type or the carbon pile type and is connected in the field 32 circuit and to be responsive to the potential of the direct current output circuit of the rectifier in the manner well known to those skilled in the art. The regulator 60, here shown, has a regulating resistance 68 and an arc reducing resistance 70 which will minimize the arcing across contacts 62 and 64 when they open. Included also in the drawing is an external direct current load 72 which may comprise the ignition system and other direct current accessories of the vehicle which are generally controlled by the ignition switch 54.

The present invention also is directed to an indicating means which includes the indicating lamp 74 and the resistance 76. The resistance is preferably connected to the output terminal 36 of the rectifier and is here shown as connected to lead 56. The indicating lamp 74, which may be suitably mounted on the dashboard of the vehicle, is connected between the output terminal 36 of the rectifier 28 and through junction 53 and the ignition switch 54 to the battery 42. When the various elements in the circuit are so connected and the switch 54 is closed, the battery voltage will be applied across the indicator lamp 74 which, in turn, will be grounded through resistance 76. When the circuit to the lamp is completed, a portion of the battery voltage will be impressed across the indicator lamp 74 and the remaining portions will be dissipated over the resistance 76. The indicator light is preferably designed to give a visible signal at a portion of the battery voltage, i.e., 6 volts in a 12 volt battery system and will burn when the alternator is not producing an A.C. voltage. When the ignition switch 54 is closed and the engine is started, the alternator will produce an A.C. voltage at terminals 24. This voltage will be rectified to a D.C. voltage and current by rectifier 28 and will be impressed from lead 56 on the left terminal of lamp 74. The alternator output voltage is impressed by the alternator across the bulb and opposes the battery voltage. When the alternator output voltage is sufficient, it will cause the voltage drop across the bulb to be reduced so the glow of the filament will no longer be visible and thus advise the motor vehicle operator that the alternating current system is in working order. It is to be appreciated that the voltage regulator 60 is preferably adjusted so that the voltage at the terminal 36 of the rectifier will be higher than that of the battery 42 so current will flow through the battery. This difference in potential between the alternator and battery will not be sufficient to cause lamp 74 to become incandescent. The opertion of lamp 74 in the foregoing circuit may also be described in terms of contacts 38 and 40. When the alternator output is sufficient to cause contacts 38 and 40 to close, then lamp 74 will be short circuited from the rectifier to battery 74 circuit. When, however, a failure of the alternator occurs, the contacts 38 and 40 will open and the battery voltage will be impressed across the resistance 76 and light 74 so that the light 74 will become incandescent and warn the operator of the vehicle of the failure in the alternator current generating system.

While the embodiment of the present invention as herein disclosed constitutes a preferred form, it is to be understood that other forms might be adopted.

What is claimed is as follows:

1. In an electric generating system for motor vehicles, the combination comprising, an alternating-current generator having an output winding, a rectifier connected with said output winding having first and second D. C. output terminals, an ignition switch, a storage battery, a cut-out relay including a first actuating coil and a first pair of switch contacts that are closed when said actuating coil is energized, a load circuit including conductor means connected with said first output terminal, means connecting said cut-out relay switch contacts in circuit between said load circuit and one side of said storage battery, means connecting the opposite side of said storage battery with said second output terminal, a second relay including a second actuating coil and a second pair of switch contacts, means connecting one side of said second actuating coil with one side of said ignition switch and for connecting the opposite side of said second actuating coil with said second output terminal, means connecting the opposite side of said ignition switch with the side of said storage battery that is connected with said cut-out relay contacts whereby said second actuating coil is energized to close said second switch contacts when said ignition switch is closed, means connecting one side of said first actuating coil with said first output terminal, means connecting the said second switch contacts of said second relay in circuit between the opposite side of said first actuating coil and said second output terminal whereby said first actuating coil is energized when said second switch contacts are closed, and a resistor connected between the side of said first actuating coil that is connected with said second switch contacts and said second output terminal providing a circuit in shunt with said second switch contacts for providing a momentary energizing circuit for said first actuating coil after said ignition switch is opened and during the time that the output voltage of the generator is just beginning to decay toward zero output, said current flow in said momentary energizing circuit being sufficient to maintain said first switch contacts closed for a short period of time.

2. In a motor vehicle generating system, the combination comprising, an alternating-current generator having an output winding and a field winding, a rectifier connected with said output winding having first and second D.C. output terminals, a load circuit including conductor means connected with said first output terminal, a cut-out relay including an actuating coil and a pair of switch contacts, a storage battery having one side thereof connected to said second output terminal, means connecting the switch contacts of said cut-out relay between the opposite side of said battery and said load circuit whereby said battery receives charging current from said generator through said rectifier when said switch contacts are closed, an ignition switch, a second relay including a second pair of switch contacts and a second actuating coil, conductor means connecting one side of said ignition switch with the side of the battery that is connected with said cut-out relay contacts, conductor means for connecting the opposite side of said ignition switch with one side of said second actuating coil and with one side of said field winding, means connecting the opposite side of said second actuating coil with said second output terminal, voltage regulating means including an actuating coil connected between said output terminals and having a variable resistance one side of which is connected with said second output terminal, means connecting the opposite side of said field winding with the opposite side of said variable resistance whereby said ignition switch controls the energization of both said field winding and said second actuating coil, means connecting one side of said cut-out relay actuating coil with said load circuit, means connecting the opposite side of said cut-out relay actuating coil with said second output terminal through the said second switch contacts of said second relay, a resistor connected between said second output terminal and the side of said cut-out relay actuating coil that is connected with said second switch contacts for providing a momentary energization path for said cut-out relay actuating coil when said ignition switch is opened and during the time that the output voltage begins to decay toward zero output, said current flow in said momentary energization path being sufficient to maintain said cut-out relay contacts closed for a short period of time, a signal lamp connected between said load circuit and the side of said ignition switch that is connected with said second actuating coil, and means providing a circuit to said second output terminal from said load circuit whereby said signal lamp will be energized when said ignition switch is closed and when said cut-out relay contacts are open, and will be extinguished when said ignition switch is closed and said cut-out relay switch contacts are closed.

3. In an electric generating system for motor vehicles, the combination comprising; an alternating current generator having an output winding, a rectifier connected with said output winding having first and second D.C. output terminals, an ignition switch, a storage battery, a cut-out relay including an actuating coil and a pair of switch contacts that are closed when said actuating coil is energized, means connecting said cut-out relay switch contacts in circuit between said first D.C. output terminal and one side of said storage battery, means connecting the opposite side of said storage battery with said second D.C. output terminal, a first circuit for energizing said actuating coil from said storage battery and one of said D.C. output terminals controlled by said ignition switch, and a second energizing circuit of higher resistance than said first energizing circuit for said relay actuating coil connected with the actuating coil and one of said D.C. output terminals, said second energizing circuit being effective to maintain said relay actuating coil energized momentarily after said ignition switch is opened and during initial decay of output voltage of said generator, the current flow through said second energizing circuit being momentarily of such a value as to maintain said switch contacts closed for a short period of time.

4. The combination according to claim 3 wherein said first energizing circuit includes the switch contacts of a second relay having an actuating coil, the energization of which is controlled by said ignition switch.

References Cited in the file of this patent
UNITED STATES PATENTS

| 1,794,400 | Forster | Mar. 3, 1931 |
| 2,557,298 | Leece et al. | June 19, 1951 |
| 2,558,644 | Claytor | June 26, 1951 |
| 2,789,265 | Halliday | Aug. 16, 1957 |

FOREIGN PATENTS

| 556,170 | France | Apr. 9, 1923 |